(12) United States Patent
Takayama et al.

(10) Patent No.: US 11,733,174 B2
(45) Date of Patent: Aug. 22, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Kei Takayama, Kanagawa (JP); Atsushi Nogami, Kanagawa (JP); Kazuhiko Kobayashi, Kanagawa (JP); Shoichi Hoshino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 17/495,483

(22) Filed: Oct. 6, 2021

(65) Prior Publication Data

US 2022/0113261 A1 Apr. 14, 2022

(30) Foreign Application Priority Data

Oct. 9, 2020 (JP) .................................. 2020-171113

(51) Int. Cl.
*G01N 21/88* (2006.01)
*G06T 7/00* (2017.01)

(52) U.S. Cl.
CPC ..... *G01N 21/8851* (2013.01); *G01N 21/8803* (2013.01); *G06T 7/0004* (2013.01); *G01N 2021/888* (2013.01); *G01N 2021/8861* (2013.01); *G06T 2207/20081* (2013.01)

(58) Field of Classification Search
CPC ........... G01N 21/8851; G01N 21/8803; G01N 2021/8861; G01N 2021/888; G06T 7/0004; G06T 2207/20081
See application file for complete search history.

(56) References Cited

U.S. PATENT DOCUMENTS

2018/0292328 A1\* 10/2018 Karube .............. G01N 21/8851

FOREIGN PATENT DOCUMENTS

JP 2018122995 A 8/2018

\* cited by examiner

*Primary Examiner* — Jamil Ahmed
(74) *Attorney, Agent, or Firm* — Canon U.S.A., Inc. IP Division

(57) ABSTRACT

An information processing apparatus includes an image obtaining unit configured to obtain an image, a first determining unit configured to determine a first image range to be used in making a determination related to inspection of an inspection target included in the image, based on a detection result of the inspection target from the image, and a second determining unit configured to determine a second image range to be used in recording an inspection result of the inspection target, the second image range being an image range indicating a wider range than a range indicated by the first image range.

26 Claims, 14 Drawing Sheets

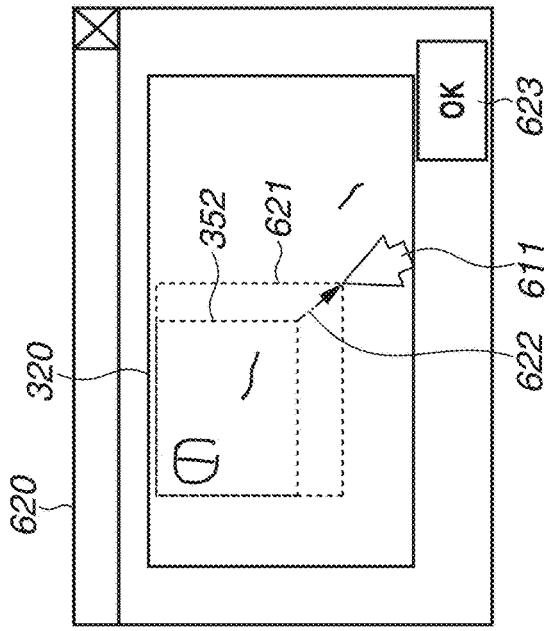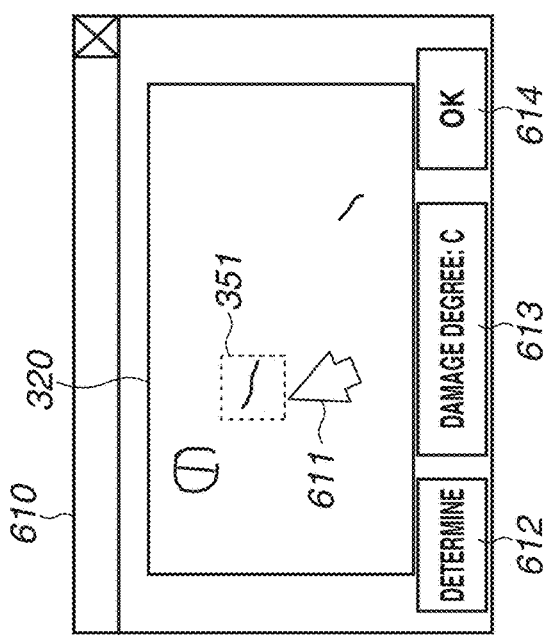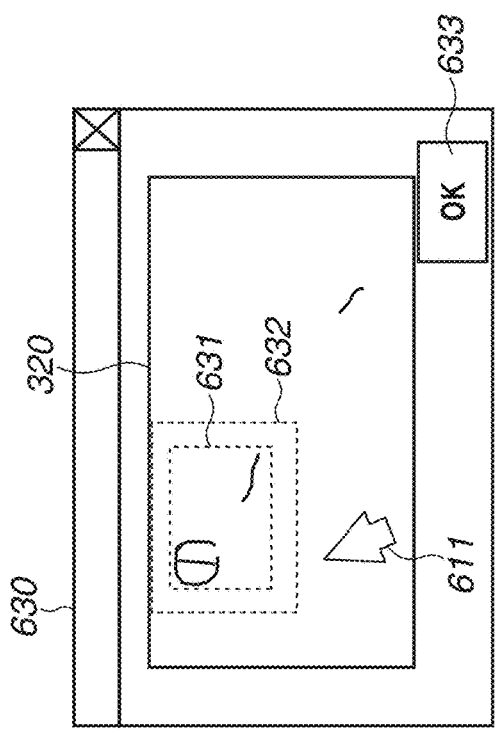

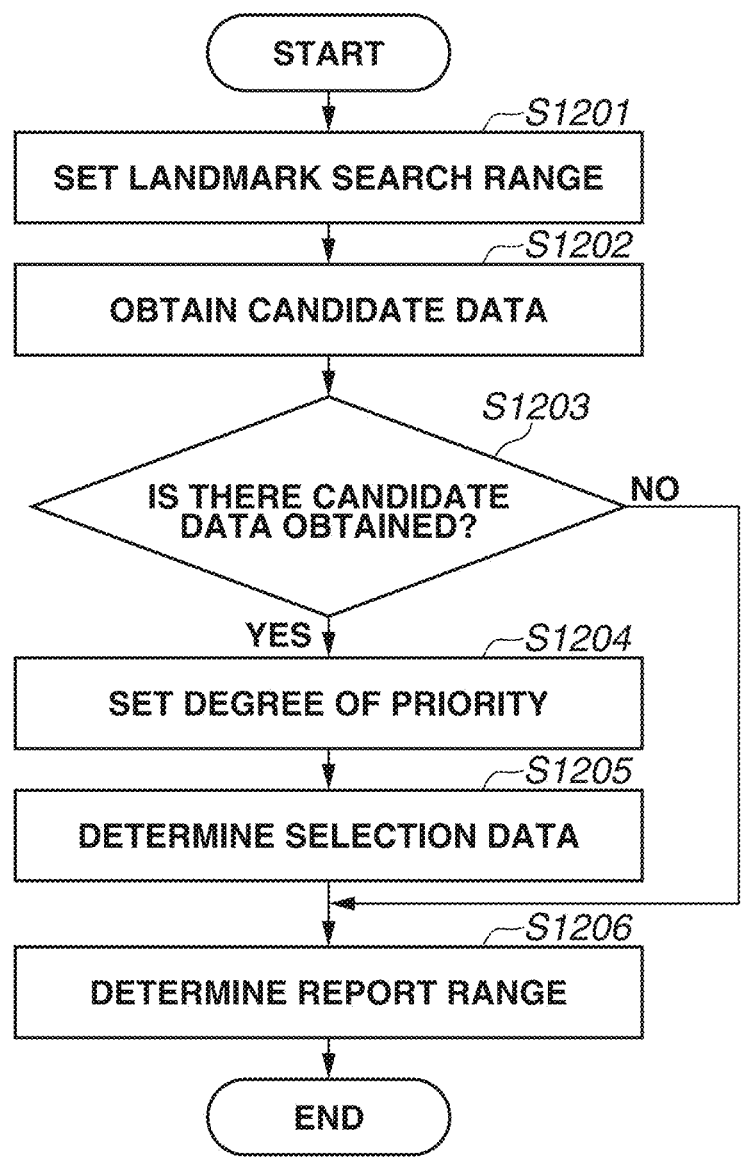

FIG.14
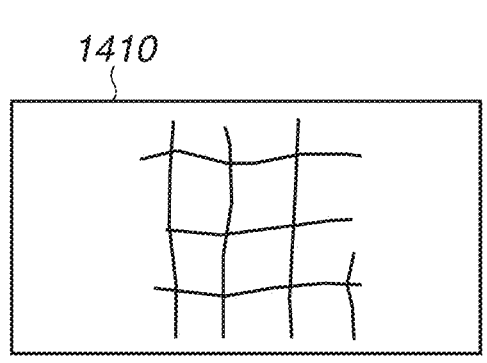
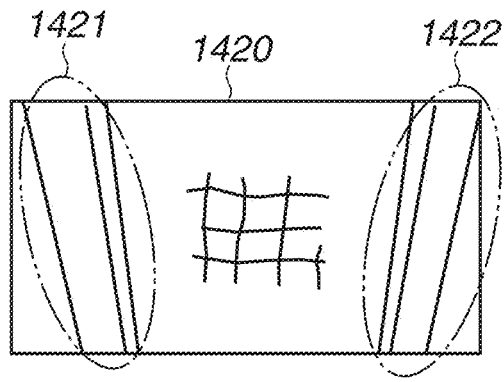
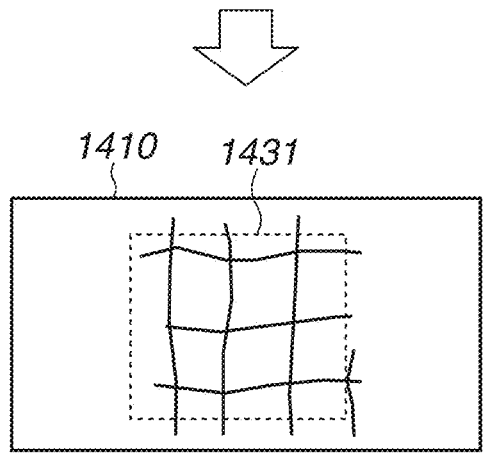
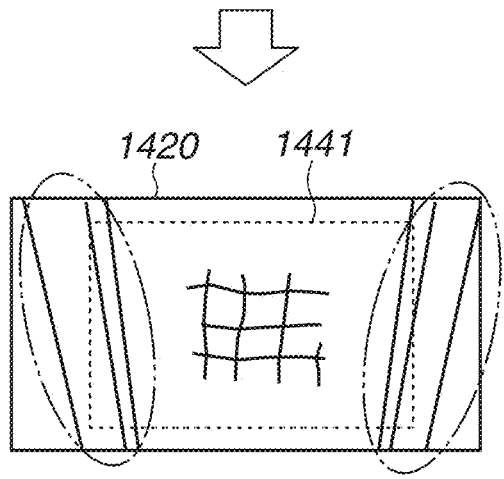

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a storage medium.

Description of the Related Art

Inspection of an infrastructural structure conventionally includes visually determining damage degrees of deformed spots, such as a crack in a concrete surface, and manually compiling determination results and images of the corresponding spots as a record of inspection results, or a report. To improve the efficiency of such inspection, Japanese Patent Application Laid-Open No. 2018-122995 discusses a method for detecting a deformation from a captured image of an object to be inspected, and automatically determining the damage degree based on the deformation.

As described above, the inspection of an infrastructural structure includes recording not only the determination results but also the images of the corresponding spots. However, the foregoing method discussed in Japanese Patent Application Laid-Open No. 2018-122995 is intended to support the operation for determining the damage degree, and an image range extracted as the detection result of a deformation to be used in determining the damage degree may be unsuitable as the image to be recorded in the report. An example of the image range used for determination is a local area, such as a deformation or a specific member. If a bridge or an inner wall of a tunnel is inspected, it is difficult from a report in which such a local image range is recorded to find out the position of the spot in the structure or a global state around the target. In the inspection of an infrastructural structure, a further improvement in efficiency is therefore desired of the method for determining the image range for recording an inspection result.

SUMMARY

Some embodiments of the present disclosure are directed to improving the efficiency of an image-based operation by determining an appropriate image range.

According to an aspect of the present disclosure, an information processing apparatus includes an image obtaining unit configured to obtain an image, a first determining unit configured to determine a first image range to be used in making a determination related to inspection of an inspection target included in the image, based on a detection result of the inspection target from the image, and a second determining unit configured to determine a second image range to be used in recording an inspection result of the inspection target, the second image range being an image range indicating a wider range than a range indicated by the first image range.

Further features of various embodiments will become apparent from the following description of exemplary embodiments with reference to the attached drawings.

BRIEF DESCRIPTION OF THE DRAWINGS

FIGS. 5A, 5B, 5C, and 5D are diagrams for describing display control processing according to the first exemplary embodiment.

FIGS. 6A, 6B, and 6C are diagrams for describing correction processing according to the first exemplary embodiment.

FIG. 12 is a flowchart illustrating processing by the information processing apparatus according to the third exemplary embodiment.

FIG. 14 is a diagram for describing processing by an information processing apparatus according to a fourth exemplary embodiment.

DESCRIPTION OF THE EMBODIMENTS

Figure 1:
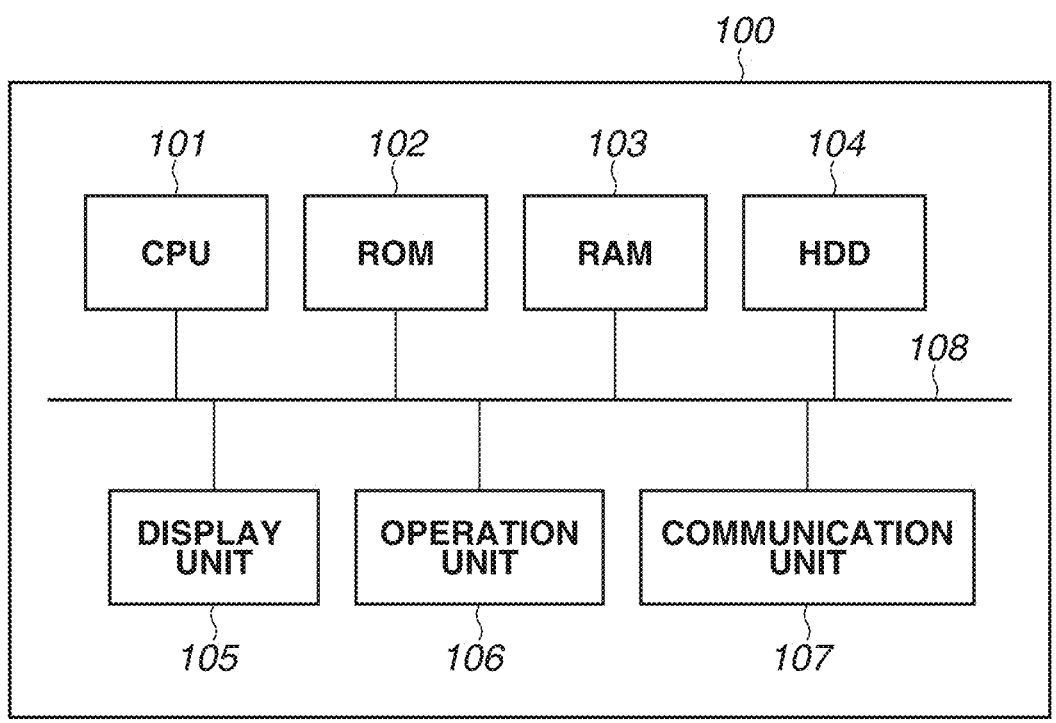
FIG. 1 is a diagram illustrating a hardware configuration of an information processing apparatus according to a first exemplary embodiment.

Exemplary embodiments will be described below with reference to the drawings.

In a first exemplary embodiment, an example of application to inspection of an infrastructural structure will be described. The present exemplary embodiment is not limited to the inspection of an infrastructural structure and can be applied to various image-based operations. First, the inspection of an infrastructural structure will be described. Examples of the infrastructural structure to be inspected include a bridge, a tunnel, and a building. Hereinafter, infrastructural structures will be referred to simply as structures. The structures are damaged over time from various causes, such as earthquakes and salt damages. As damages develop, various deformations, such as cracks and precipitates, appear in/on the surface of the structure, and the damage to the structure can thus be checked based on information about the surface deformations. In the inspection of an infrastructural structure, the degrees of damage, or damage degrees, of areas or members are determined based on the state of corresponding deformations. In conventional inspection, an inspector captures an image of a spot including a deformation or a specific member, visually determines the damage degree, and records the determination result and the captured image together in a report. The damage degree is determined in terms of ranks "A", "B", "C", and "D" according to evaluation grades based on characteristics of the deformation. While the damage degree will be described to be ranked in four grades, this is not restrictive.

Hereinafter, the deformation or specific member in/on the surface of a structure to be subjected to a damage degree determination as a test in an inspection operation will be referred to as an inspection target. The inspection target is an example of an object. In the present exemplary embodiment, a method for appropriately determining both an image range to be used in making the damage degree determination of an inspection target and an image range for recording the inspection target in a report for a captured image of the surface of a structure to be inspected will be described. The item to be determined is not limited to the damage degree, and other items, such as the state of an object and the likelihood of being an object, may be determined.

In the following description, the image range to be used in making the damage degree determination will be referred to as a determination range (corresponding to a first image range). The image range for recording the inspection target in a report will be referred to as a report range (corresponding to a second image range). An information processing apparatus 100 according to the first exemplary embodiment determines a determination range and a report range that include the same inspection target and have respective different sizes. Specifically, the information processing apparatus 100 may determine an image range suitable for the damage degree determination as a determination range, and then determine a report range wider than the determination range. For example, the determination range may be a range including an inspection target with the inspection target at the center. This facilitates finding out the position of the inspection target and the state of the surroundings when the report is referred to afterward. Moreover, the information processing apparatus 100 may determine the report range based on a predetermined characteristic portion (hereinafter, referred to as a landmark) from which the position of the report range on the structure can be identified or estimated. Specifically, the information processing apparatus 100 determines the report range so that the landmark is included. This makes finding out the position of the inspection target even easier. Details of the first exemplary embodiment will be described in detail below with reference to FIGS. 1 to 7C.

First, a configuration of the information processing apparatus 100 according to the first exemplary embodiment will be described with reference to FIGS. 1 and 2. FIG. 1 is a hardware configuration diagram of the information processing apparatus 100 according to the first exemplary embodiment. As illustrated in FIG. 1, the information processing apparatus 100 includes a central processing unit (CPU) 101, a read-only memory (ROM) 102, a random access memory (RAM) 103, a hard disk drive (HDD) 104, a display unit 105, an operation unit 106, a communication unit 107, and a system bus 108 connecting these components. The CPU 101 controls the entire information processing apparatus 100. The ROM 102 is a program memory and stores control programs for the CPU 101. The RAM 103 is used as a temporary storage area, such as a main memory and a work area of the CPU 101.

The HDD 104 stores data and programs for use in processing to be described below. The information processing apparatus 100 may include an external storage device instead of or in addition to the HDD 104. For example, the external storage device can be implemented by a medium (recording medium) and an external storage drive for accessing the medium. Known examples of such a medium include a flexible disk (FD), a compact disc read-only memory (CD-ROM), a digital versatile disc (DVD), a Universal Serial Bus (USB) memory, a magneto-optical (MO) disc, and a flash memory. The external storage device may be a network-connected server apparatus.

The display unit 105 is a device that outputs an image on a display screen. Examples thereof include a cathode-ray tube (CRT) display and a liquid crystal display. The display unit 105 may be an external device connected to the information processing apparatus 100 in a wired or wireless manner. The operation unit 106 includes a keyboard and a mouse, and accepts various operations made by a user. The communication unit 107 performs wired or wireless bidirectional communication with an external apparatus, such as another information processing apparatus, a communication device, and a server apparatus, using conventional communication techniques.

Figure 2:
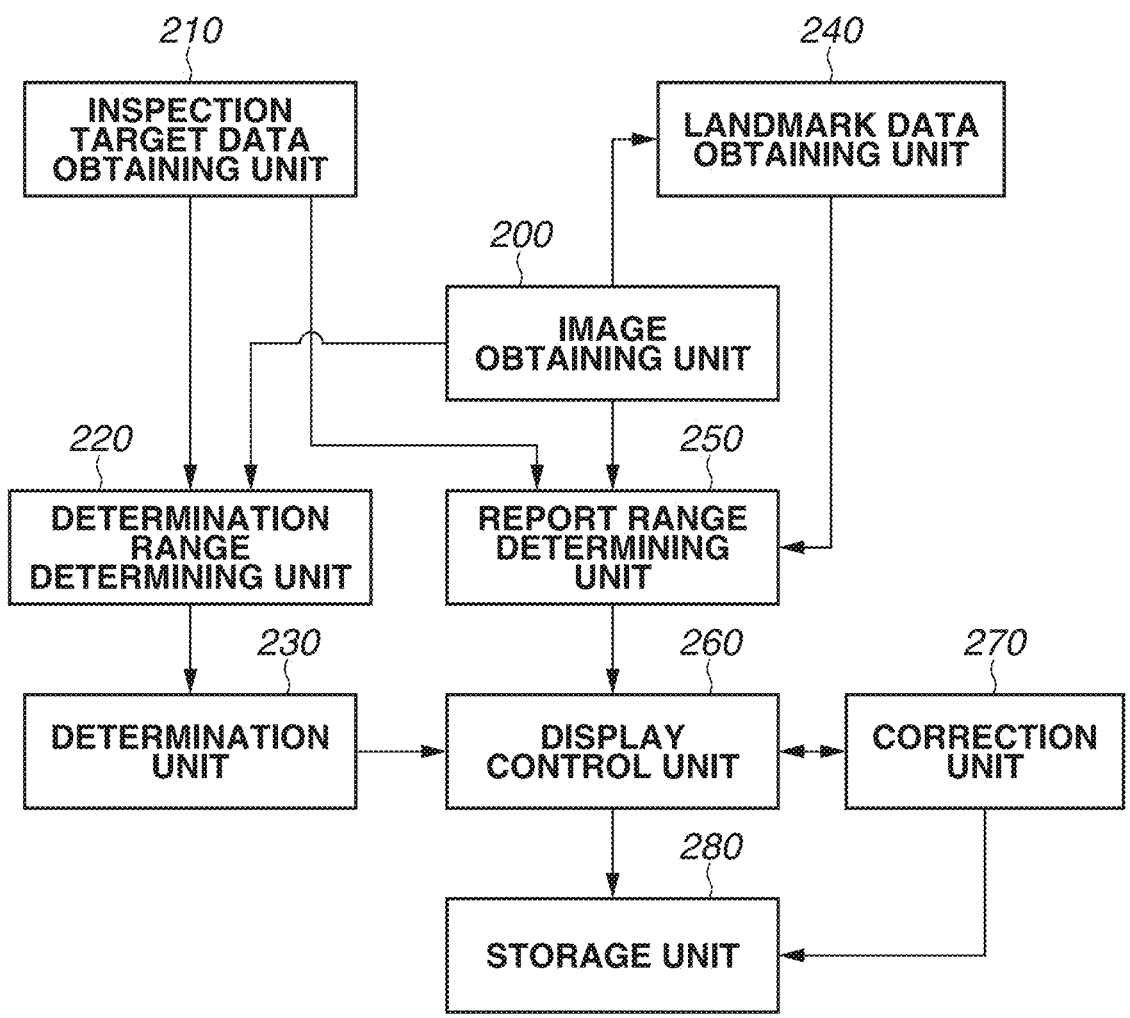
FIG. 2 is a block diagram illustrating a functional configuration of the information processing apparatus according to the first exemplary embodiment.

FIG. 2 is a block diagram illustrating a functional configuration of the information processing apparatus 100 according to the first exemplary embodiment. The information processing apparatus 100 functions as functional units illustrated in FIG. 2 by the CPU 101 loading programs stored in the ROM 102 into the RAM 103 and executing the programs. As another example, various functions and processes of the information processing apparatus 100 may be implemented by the CPU 101 loading programs from an external storage device connected to the information processing apparatus 100. As yet another example, part of the functional configuration of the information processing apparatus 100 may be implemented by using a hardware circuit.

Figure 3:
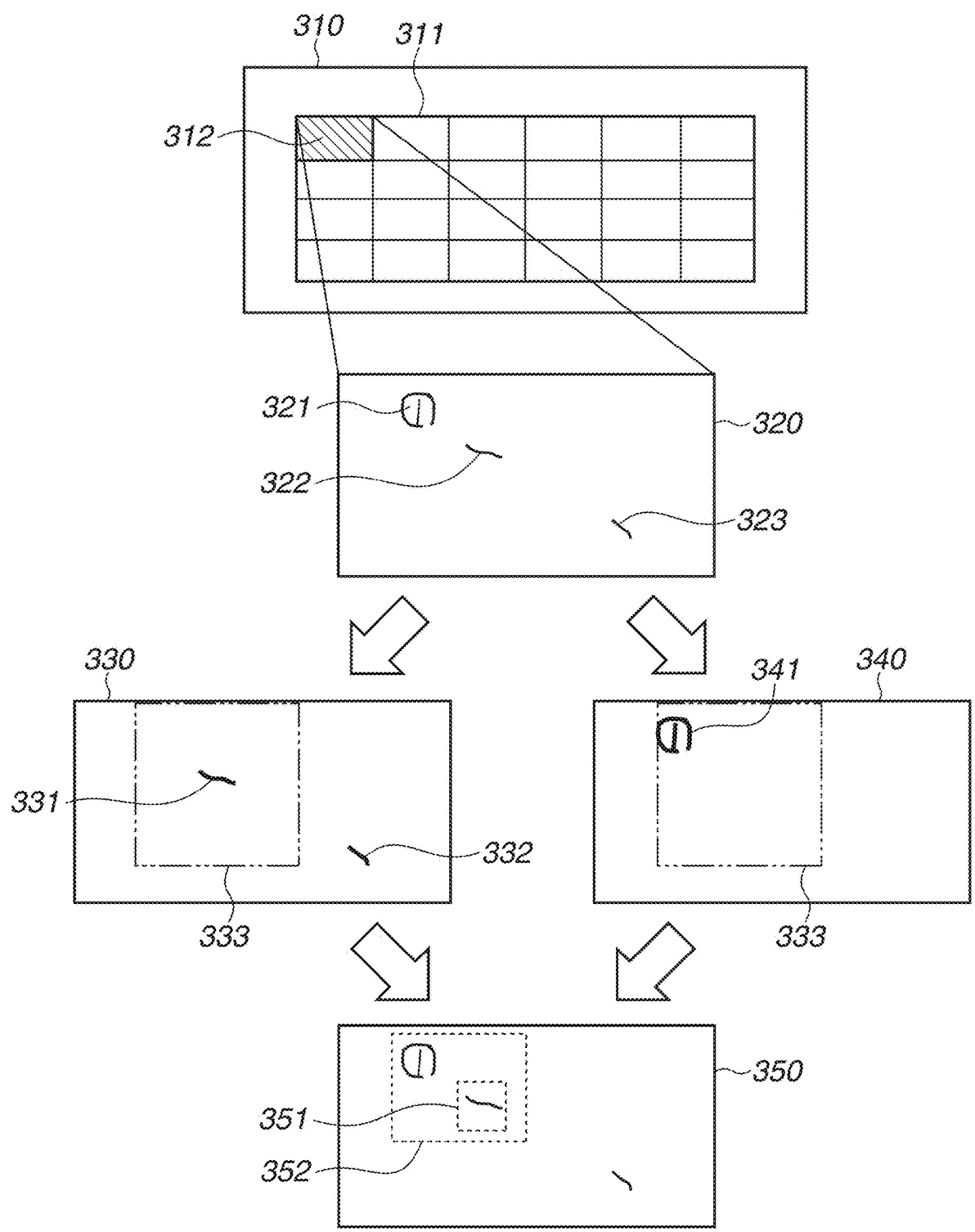
FIG. 3 is a diagram for describing processing by the information processing apparatus according to the first exemplary embodiment.

As illustrated in FIG. 2, the information processing apparatus 100 includes an image obtaining unit 200, an inspection target data obtaining unit 210, a determination range determining unit 220, a determination unit 230, a landmark data obtaining unit 240, and a report range determining unit 250. The information processing apparatus 100 further includes a display control unit 260, a correction unit 270, and a storage unit 280. Various processes performed by the functional units illustrated in FIG. 2 will be described below with reference to FIG. 3. FIG. 3 is a diagram for describing a series of processes performed by the information processing apparatus 100 according to the first exemplary embodiment.

The image obtaining unit 200 obtains an image of the structure to be inspected. The image for the image obtaining unit 200 to obtain will now be described. Since the structure inspection includes inspecting fine deformations on a concrete wall surface, a high-definition image of the entire surface of the structure is to be used. In the present exemplary embodiment, the image obtaining unit 200 sections the surface of the structure into a plurality of cells, and obtains a plurality of cell images captured cell by cell. The cell images are associated with a design drawing of the structure. A method where the information processing apparatus 100 sequentially obtains the cell images and performs a series of processes to be described below will be described. In the present exemplary embodiment, an example of inspecting a floor slab of a bridge will be described. For that purpose, the image obtaining unit 200 obtains captured images of the surface of the bridge floor slab. Inspection targets are cracks in the structure.

A rectangle 310 in FIG. 3 represents the design drawing of the bridge floor slab. A rectangle 311 represents an image of specific cells of the floor slab. The rectangle 311 is divided into areas in a grid pattern, and the divided areas correspond to cell images. An image 320 is a cell image corresponding to a divided area 312 in the rectangle 311. Curves 322 and 323 in the image 320 represent cracks. Chalk lines 321 represent chalk lines drawn on the floor slab by an inspector in the past, and indicate the number of the specific area of the floor slab.

The inspection target data obtaining unit 210 obtains inspection target data from the image. The inspection target data means position data on an inspection target, and is referred to in determining the determination range and the report range. In the first exemplary embodiment, the inspection target data obtaining unit 210 obtains the inspection target data by using a crack detection model trained to detect a detection target (here, a crack) from an image. The crack detection model is a trained model stored in the HDD 104, and is generated by being trained with a large number of pieces of training data each including a pair of images, namely, an image of a concrete wall surface and a ground truth image indicating a crack position or crack positions in the image. The ground truth image has the same size as the corresponding image, and stores 1 in pixels corresponding to pixels of the corresponding image where the detection target is, and 0 in the other pixels. Models, including models to be described below, can be trained by using any machine learning algorithm. For example, a neural network algorithm can be used. If the inspection target data obtaining unit 210 applies the crack detection model to an image, a likelihood map is obtained. The likelihood map contains values close to 1 in areas that are likely to be the detection target on the image and values close to 0 in other areas. An image obtained by binarizing the likelihood map with a predetermined value as a threshold will be referred to as a detection result. In other words, deformations and specific members to be inspected are detected based on output with respect to input of the image to the crack detection model. In such a manner, the inspection target data obtaining unit 210 obtains a crack detection result from the image.

An image 330 in FIG. 3 is a crack detection result obtained by applying the crack detection model to the image 320. Areas 331 and 332 are areas where pixels detected to be a crack continue. Data thus obtained by a model will be referred to as detection data. The crack detection data corresponds to the foregoing inspection target data. The area 331 of the image 330 corresponds to the curve 322 in the image 320. The area 332 of the image 330 corresponds to the curve 323 in the image 320.

The determination range determining unit 220 determines an image range to perform damage degree determination processing on an inspection target in the image as a determination range. The position of the determination range is determined based on the inspection target data. More specifically, the determination range determining unit 220 determines the determination range in the image to be used in making a determination related to the inspection of the inspection target included in the image based on the detection result of the inspection target from the image. In the first exemplary embodiment, the determination range determining unit 220 determines the determination range based on image conditions for the images used to train a damage degree determination model to be described below, which is used by the determination unit 230. Specifically, the determination range determining unit 220 determines the determination range by using the same conditions about the image size and the position of the detection target in the image as with the images used for training. For example, the determination range determining unit 220 sets the size of the image range to a predetermined size used in training the damage degree determination model, and locates the image range so that the center position thereof coincides with the center of the inspection target data. In the example of FIG. 3, the determination range determining unit 220 calculates the center of gravity of the area 331 representing the inspection target data, and determines a determination range 351 by determining the position of an image range of the predetermined size so that the center of gravity comes to the center. An image 350 in FIG. 3 is the same image as the image 320.

The determination unit 230 makes a determination on an image cut out to the determination range. In the first exemplary embodiment, the determination unit 230 makes a damage degree determination using a model for determining a damage degree of an image (damage degree determination model) that is trained in advance and stored in the HDD 104. In the first exemplary embodiment, the damage degree determination model is trained to output a damage degree based on the state of a crack or cracks in an image since the inspection target is the crack. For example, the damage degree is ranked in four grades, ranks "A" to "D", and the damage degree determination model is trained so that the more severe the damage of an inspection target in the image is, the rank closer to "A" is output. To generate such a model, a large number of images of the predetermined size are prepared, and each image is manually given a damage degree rank by visual observation.

For example, if the image includes dense cracks or a crack with water leakage, the damage is considered to be severe, and the damage degree is determined to be rank "A". If the image includes only thin cracks, the damage is considered to be not so severe, and the damage degree is determined to be rank "D". The determination unit 230 trains the damage degree determination model by using a large number of pairs each including an image of the predetermined size and the damage degree given to the image. Any machine learning algorithm may be used for the training, and an example thereof is a support-vector machine. Alternatively, an architecture including a convolutional neural network (CNN) and fully-connected (FC) layers may be used as a deep learning-based method. In making the damage degree determination using the damage degree determination model trained thus, the determination unit 230 inputs an image of the same size as that of the images used for training into the damage degree determination model. In other words, the determination unit 230 can simply use and input the image cut out to the determination range determined by the determination range determining unit 220. As a result, a damage degree rank is obtained.

The landmark data obtaining unit 240 obtains information about a landmark from the image. As employed herein, the landmark refers to information from which the position in the structure can be identified or estimated. Examples thereof include a structural part characteristic to each portion of the structure, and an artificial mark. Here, the chalk lines 321 are used as the landmark. In the first exemplary embodiment, the landmark data obtaining unit 240 obtains position data on a landmark within a predetermined range of distance from the inspection target data.

First, the landmark data obtaining unit 240 sets a landmark search range to search for landmarks near the inspection target. For example, the landmark data obtaining unit 240 sets a landmark search range 333 of a predetermined size so that the center of the landmark search range 333 coincides with the center of gravity of the area 331 (inspection target data). Next, the landmark data obtaining unit 240 detects a landmark from a range corresponding to the landmark search range 333 in the image 320. In the first exemplary embodiment, the landmark data obtaining unit 240 obtains landmark data by using a model that is trained in advance to detect a predetermined landmark by a similar method to the method for generating the foregoing crack detection model. The landmark data refers to position data on the landmark. In the first exemplary embodiment, a model for detecting chalk lines as the predetermined landmark is applied to the image of the landmark search range 333, and an image 340 is obtained as a detection result. An area 341 of the image 340 corresponds to the chalk lines 321 in the image 320.

The report range determining unit 250 determines an image range different from the determination range on the image. Specifically, the report range determining unit 250 determines the report range based on the landmark data. More specifically, the report range determining unit 250 determines the report range so that the landmark data and the inspection target data are included. For example, the report range determining unit 250 obtains the leftmost, rightmost, topmost, and bottommost coordinate points from combined data of the inspection target data and the landmark data, and determines the report range to include the coordinate points. While, in the first exemplary embodiment, the report range determining unit 250 determines the report range so that the entire landmark data is included, the report range may be determined to include only part of the landmark data. For example, a landmark with a large area, such as a diagonal member, is useful in identifying the position on the structure even if only part of the landmark is included in the report range.

Alternatively, the report range determining unit 250 may determine a range that includes the inspection target and is wider than the determination range as the report range. In such a case, the landmark data obtaining unit 240 is not needed. Alternatively, if no landmark data is obtained by the landmark data obtaining unit 240, the report range determining unit 250 may determine a range wider than the set landmark search range as the report range. For example, if the landmark search range has a size of 1000×1000 pixels, the report range determining unit 250 may determine the size of the report range to be greater, for example, 2000×2000 pixels. As a result, an image of a somewhat wider field of view can be cut out as the report range to facilitate finding out which part of the landmark has been captured. The report range determining unit 250 may determine the size of the report range based on the size of the determination range. For example, the report range determining unit 250 may determine a size obtained by expanding the periphery of the determination range by a predetermined amount as the size of the report range.

To allow the user to check the determination result of the determination unit 230 and the report range determined by the report range determining unit 250, the display control unit 260 controls generation and output of a check screen (FIGS. 5A, 5B, 5C, and 5D) to the display unit 105. The check screen displays an image (hereinafter, referred to as a report image) cut out of the image 320 based on the report range. The correction unit 270 accepts user's corrections to the determination result and the report range via the operation unit 106. The storage unit 280 records a set of the determination result and the report image for each inspection target onto the HDD 104 as an inspection result.

Figure 4A:
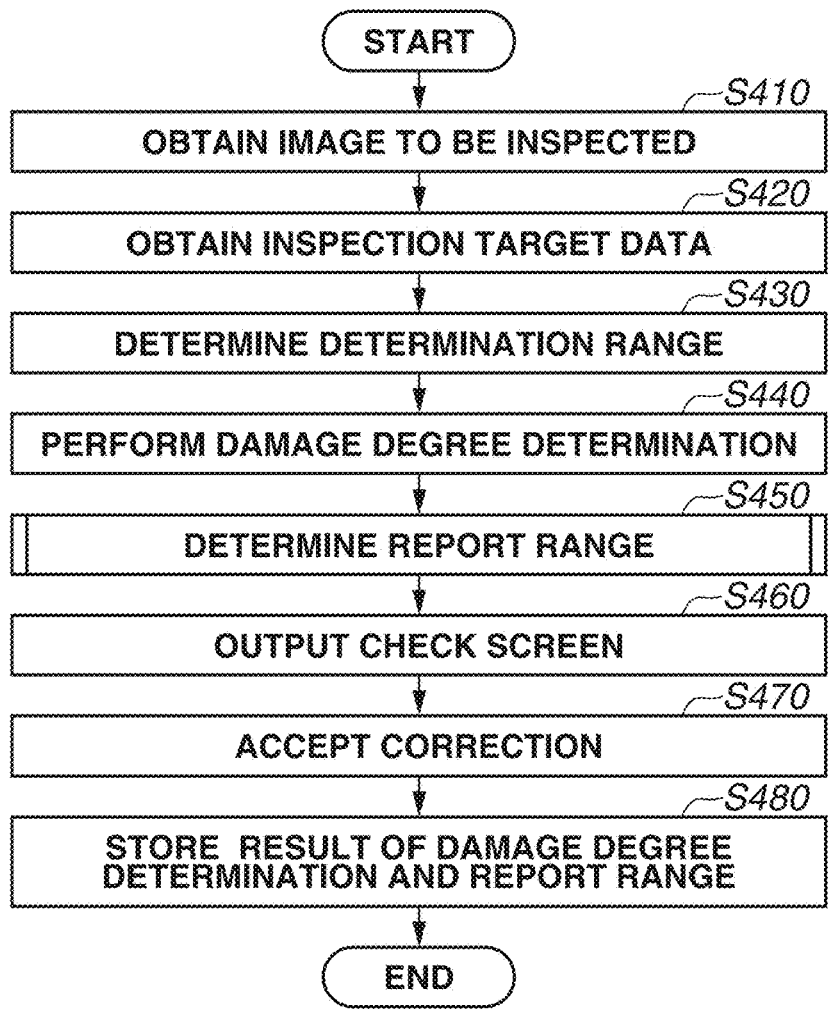
FIGS. 4A and 4B are flowcharts illustrating the processing by the information processing apparatus according to the first exemplary embodiment.
Figure 4B:
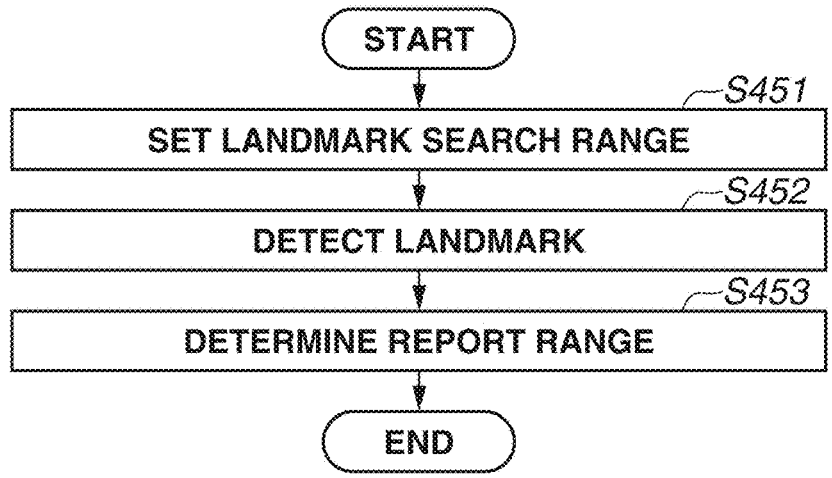

FIGS. 4A and 4B are flowcharts illustrating processing by the information processing apparatus 100 according to the first exemplary embodiment. FIG. 4A is a flowchart illustrating an overall procedure of the processing by the information processing apparatus 100. FIG. 4B is a flowchart illustrating details of processing for determining a report range in FIG. 4A (S450). The processing of the flowcharts of FIGS. 4A and 4B is implemented by the CPU 101 loading programs stored in the ROM 102 into the RAM 103 and executing the programs.

First, in S410, the image obtaining unit 200 obtains an image to be inspected from the HDD 104 or an external apparatus connected via the communication unit 107. Here, the image 320 of FIG. 3 is obtained. In the first exemplary embodiment, the image obtaining unit 200 obtains an image associated with the design drawing. However, the image obtaining unit 200 may obtain an image not associated with the design drawing. Next, in S420, the inspection target data obtaining unit 210 obtains inspection target data targeted for determination from the image obtained in S410. In the first exemplary embodiment, the inspection target data obtaining unit 210 obtains the inspection target data from the image 320 by performing detection processing using a model (here, the crack detection model). The areas 331 and 332 in FIG. 3 correspond to the inspection target data. Alternatively, the inspection target data obtaining unit 210 may detect inspection targets based on manual inputs made on the image 320 without the detection processing. In other words, the inspection target data obtaining unit 210 may obtain position information about inspection targets specified by the user's manual inputs on the image 320. Hereinafter, processing for determining a determination range and a report range for the inspection target data corresponding to the area 331 will be described.

Then, in S430, the determination range determining unit 220 determines the determination range for the image obtained in S410. In the first exemplary embodiment, the determination range determining unit 220 determines the determination range based on the inspection target data obtained in S420 and the image conditions about the images used by the determination unit 230 in training the model (here, the damage degree determination model). For example, the determination range determining unit 220 sets the size of the image range to the predetermined size used in training the damage degree determination model, and locates the image range so that the center position thereof coincides with the center of the inspection target data. Here, the determination range 351 of FIG. 3 is determined for the area 331.

If the inspection target exceeds the image range of the predetermined size, some of the deformation information affecting the determination can be missing in the determination range and the damage degree can fail to be correctly determined. In view of this, a plurality of damage degree determination models trained with images of different predetermined sizes may be stored in the HDD 104 so that the determination range determining unit 220 can select one of the predetermined sizes based on the size of the inspection target. In such a case, the determination unit 230, in the next S440, makes a determination by using a damage degree determination model applicable to an image of the predetermined size that has been selected. Moreover, if the inspection target data lies near an end of the image, the determination range can protrude from the image obtained in S410. In such a case, the image obtaining unit 200 may obtain the cell image adjoining on the design drawing, and the determination range determining unit 220 may determine the determination range across the cell images. In the first exemplary embodiment, the determination range determining unit 220 determines the determination range based on the image conditions about the images used by the determination unit 230 in training the model. However, this is not restrictive. The determination range may be determined based on an image size or an aspect ratio set in advance.

In S440, the determination unit 230 makes a determination on the determination range determined in S430. In the first exemplary embodiment, the determination unit 230 obtains the damage degree rank output as a result of inputting the image of the determination range determined by the determination range determining unit 220 into the damage degree determination model. Suppose here that the determination unit 230 inputs the image of the determination range 351 in FIG. 3 into the damage degree determination model, and the damage degree rank "C" is output.

In S450, the landmark data obtaining unit 240 and the report range determining unit 250 perform processing for determining a report range for the image obtained in S410. Details of the processing for determining the report range will be described with reference to FIG. 4B. As employed herein, the landmark is an object serving as a mark for identifying the position of the corresponding inspection target on the structure. In other words, the landmark is a conspicuous area having characteristics different from those of surrounding areas. First, in S451, the landmark data obtaining unit 240 sets a landmark search area for the inspection target data obtained in S420. For example, the landmark data obtaining unit 240 sets the landmark search area by setting an image range of the predetermined size so that the center position of the image range coincides with the center of the inspection target data. This enables a search for a landmark near the inspection target data. In the example illustrated in FIG. 3, the landmark search range 333 is set for the area 331 serving as the inspection target data.

While the landmark data obtaining unit 240 sets the landmark search range with reference to the inspection target data, this method is not restrictive, and the entire image 320 may be set as the landmark search range. In such a case, the landmark data obtaining unit 240 obtains the landmark data from the entire range of the image 320 in S452, and the report range determining unit 250 determines the report range in S453 so that the obtained landmark data and the inspection target data are included. Furthermore, the report range determining unit 250 may select a landmark to be included in the report range based on a predetermined condition. If the inspection target and the landmark are located away from each other, the report image can become extremely large. Thus, the information processing apparatus 100 may set the maximum size of the report range in view of observability of the inspection target in the report image and balance in appearance. The maximum size of the report range is set based on the size of the inspection target, the recording size of the report image, or the resolution of the image. The size of the inspection target includes not only the overall size of the inspection target but also the sizes of parts constituting the inspection target. The report range determining unit 250 limits the size of the report range to below the maximum size. If the inspection target data is located near an end of the image, the image obtaining unit 200 may obtain the cell image adjoining on the design drawing, and the landmark data obtaining unit 240 may set the landmark search range across the cell images.

In S452, the landmark data obtaining unit 240 detects a landmark from the image of the landmark search range set in S451. In the first exemplary embodiment, the landmark data obtaining unit 240 obtains landmark data by detecting the landmark using a model. In the example illustrated in FIG. 3, the area 341 is detected as the landmark data from the image of the landmark search range 333. In other words, in the example illustrated in FIG. 3, the chalk lines 321 are the conspicuous area having characteristics different from those of the surrounding areas, and detected as the landmark.

While, in the first exemplary embodiment, the landmark data obtaining unit 240 obtains the landmark data by detecting a landmark from an image by using a model, the position of the landmark may be determined based on position information manually set in advance without the detection. Specifically, information indicating a portion suitable as a landmark (for example, a characteristic portion such as a numeral written in chalk) is set in advance. Then, the landmark data obtaining unit 240 may accept an input operation about the portion suitable as a landmark on the image, and obtain position information for which the input operation is accepted. This enables generation of a report image that suits the user's preference by the processing of the report range determining unit 250.

In S453, the report range determining unit 250 determines the report range based on the inspection target data obtained in S420 and the landmark data obtained in S452. Here, an image range including the area 331 and the area 341 in FIG. 3 is determined as a report range 352. In this example, the chalk lines 321 in the image 320 corresponding to the area 341 represent a number indicating the specific area of the floor slab as described above. Thus, inclusion of such information in the report range 352 facilitates identifying which part of the floor slab the report range 352 is when the report image is referred to afterward. While the chalk lines 321 represent the number indicating the specific area of the floor slab, the chalk lines 321 may be a curve or a mark instead of the number. If no landmark is detected in S452, the report range determining unit 250 may determine an image range of the predetermined size wider than the determination range as the report range. For example, if no landmark is detected, the report range determining unit 250 may determine the landmark search range as the report range, or a range wider than the landmark search range as the report range. While the report range determining unit 250 is described to set the image range around the inspection target so that the inspection target is included in the report range, this is not restrictive. The report range determining unit 250 may determine an image range not including the inspection target as the report range. In such a case, the report may include both the image of the determination range and the image of the report range. The report range here may be a conspicuous area located near the inspection target and capable of identifying the inspection target, or an area located near the inspection target and including a deformation of interest. The resulting report thus includes information from which the position of the inspection target in the structure can be identified and information about the state of the surroundings of the inspection target for improved convenience. By the foregoing processing of S451 to S453, the report range can be determined for the image. After S453, the processing proceeds to S460. If a plurality of pieces of inspection target data is obtained in S420, the information processing apparatus 100 performs the processing of S430 to S453 on the next piece of inspection target data.

With the report range determined in the processing of S450, then in S460, the display control unit 260 generates and outputs the check screen to allow the user to check the result of the damage degree determination made in S440 and the report range determined in S450. In the first exemplary embodiment, the display control unit 260 generates the check screen in a report format and displays the check screen on the display unit 105. FIGS. 5A, 5B, 5C, and 5D are diagrams for describing display control processing performed by the display control unit 260. FIG. 5A is a diagram illustrating an example of the check screen. A left region 512 of a check screen 510 in FIG. 5A displays description fields for items to be included in the report (such as date and damage type). A right region 513 displays the report image. A description field 511 indicating the result of the damage degree determination (here, "C") is displayed as one of the items.

While one report image is displayed in the right region 513 of the check screen 510, a plurality of report images may be displayed. In such a case, the report range determining unit 250 determines a second report range wider than a first report range aside from the first report range, with the report range determined by the method described above as the first report range. Then, the display control unit 260 outputs the first report range and the second report range along with the determination result. A check screen 520 in FIG. 5B displays an image 523 of the first report range and an image 521 of the second report range along with the description field 511 for the damage degree. The image 521 is the same as the image 320. The image 523 is an enlarged image of a local area including an inspection target 522 in the image 521. Recording a plurality of report images of different sizes can further facilitate location identification.

The display control unit 260 may display the determination range and the report range on the same screen in a comparable manner as in a check screen 530 of FIG. 5C. The check screen 530 of FIG. 5C displays a determination range 534 of an inspection target 531 and a report range 533 of the inspection target 531 as superimposed on the image 350. Displaying the determination range and the report range on the same screen enables checking the output from the viewpoint of whether the report range is appropriate for the determination range.

Referring back to the description of FIG. 4A, in S470, the correction unit 270 corrects the result of the damage degree determination and the report range output in S460 based on user operations. A specific correction method will be described with reference to FIGS. 6A, 6B, and 6C. FIGS. 6A, 6B, and 6C are diagrams for describing correction processing performed by the correction unit 270.

<Method for Correcting Result of Damage Degree Determination>

First, a method for correcting the result of the damage degree determination will be described. If a correct button 515 displayed in the description field 511 for the damage degree on the check screen 510 is selected, the display control unit 260 switches display from the check screen 510 to a correction screen 610 of FIG. 6A. The correction screen 610 displays the image 320 obtained in S410 with the determination range 351 superimposed thereon, as well as a result 613 of the damage degree determination. If the user desires to directly correct the determination result, the correction unit 270 corrects the result 613 of the damage degree by having the user directly edit the result 613 of the damage degree determination.

On the other hand, if the user desires to correct the determination range 351, the correction unit 270 corrects the determination range 351 based on operations on the determination range 351. In the first exemplary embodiment, the determination range 351 has the predetermined size, and the correction unit 270 corrects the position of the determination range 351 without changing the size. For example, the user moves the position of the determination range 351 by hovering a mouse pointer 611 over the determination range 351 and performing a drag operation. If the user then selects a determination button 612, the determination unit 230 makes a damage degree determination again. Then, the display control unit 260 receives the result of the damage degree determination made again from the determination unit 230, and updates the result 613 of the damage degree determination. If the user then selects an OK button 614, the correction is finalized, and the display control unit 260 switches display from the correction screen 610 to the check screen 510. The corrected damage degree is reflected on the description field 511 for the damage degree on the switched check screen 510. The above is the method for correcting the result of the damage degree determination.

<Methods for Correcting Report Range>

Next, methods for correcting the report range will be described. Here, a method for directly editing the report range and a method for selecting a report range candidate from a plurality of report range candidates will be described. First, as a first method, the method for directly editing the report range will be described. If the user selects a correct button 516 for the report image on the check screen 510, the display control unit 260 switches display from the check screen 510 to a correction screen 620 of FIG. 6B. The correction screen 620 displays the image 320 with the report range 352 superimposed thereon. For example, the user hovers the mouse pointer 611 over an end point of the report range 352 and makes a drag operation in the direction of the arrow 622. The correction unit 270 modifies the report range 352 into an image range 621 accordingly.

Next, as a second method, the method for selecting a report range candidate from a plurality of report range candidates will be described. In this method, the report range determining unit 250 stores the plurality of report range candidates into the ROM 102, RAM 103, etc. in advance (for example, at the point in time of S450). The correction unit 270 makes the user select an appropriate report range candidate from among the report range candidates, and corrects the report range to the selected candidate. A check screen 630 of FIG. 6C displays an image range 631 and an image range 632 on the image 320 as report range candidates. The ends of the image range 631 are located at the leftmost, rightmost, topmost, and bottommost coordinates of the inspection target data and the landmark data. The image range 632 is obtained by expanding the periphery of the image range 631 by a predetermined amount. If the user selects the image range 632 with the mouse pointer 611, the correction unit 270 determines the image range 632 as the report range. Such processing for selecting the report range candidate from the plurality of report range candidates may be performed in the processing of S450.

If the report range is modified by either of the foregoing methods and then an OK button 623 or 633 is selected, the modification is finalized, and the display control unit 260 switches display to the check screen 510. The right region 513 of the switched check screen 510 displays the report image of the modified report range. The above are the methods for correcting the report range.

In S480, the storage unit 280 stores the result of the damage degree determination and the report range as a set into the ROM 102, RAM 103, etc. In the first exemplary embodiment, the storage unit 280 stores the data in the report format displayed on the check screen 510 if an accept button 517 on the check screen 510 is selected. Then, the series of processes of the flowchart ends. The data for the storage unit 280 to store is not limited to data in the report format, and may be data in a file format as illustrated in FIG. 5D. FIG. 5D illustrates a data table storing position information about determination ranges and report ranges. The data table stores coordinate information about the determination range and coordinate information about the report range for each inspection target in the image. The coordinate information is position information on the image, whereas position information on the design drawing may be used instead.

In the first exemplary embodiment described above, image ranges respectively suitable for determination purposes and report purposes can be determined for an image in making the damage degree determination on an inspection target during structure inspection. An image from which the position and state of the inspection target can be easily found out afterward can thereby be recorded and left as the report image, with determination precision for the inspection target ensured. In other words, the efficiency of structure inspection can be improved. While the processing procedure has been described with reference to the flowcharts of FIGS. 4A and 4B, the processing order may be changed as appropriate. For example, the processing for determining the determination range (S430) and the processing for making the damage degree determination (S440) may be executed after the execution of the processing for determining the report range (S450).

<Landmark>

While, in the foregoing description, the chalk lines are used as the landmark, the landmark is not limited thereto, and any characteristic portion (predetermined characteristic portion) from which the location of the spot including the inspection target can be identified or estimated may be used. In structure inspection, an artificial mark, a member of the structure, a boundary of a structural member, a crack occurred during construction, and an artifact can be used as variations of the landmark. Hereinafter, the landmark will be described in detail.

Examples of the artificial mark include a mark drawn on the concrete surface with ink, aside from a chalk line. Examples of the member include a diagonal member, a beam, a bearing, an iron plate, and a bolt. If the member is included in the report image, the location of the spot can be found out based on the position of the member on the design drawing. Examples of the boundary of a structural member include a border between the sky and the concrete wall surface, and a border between the ground and the concrete wall surface. The inclusion of the boundary of a structural member in the report image is useful in finding out the location and state of the spot since the captured image is known to include an end of the structure. Examples of the crack occurred during construction include formwork marks and joints. The inclusion of joints and formwork marks in the report image facilitates finding out the scale of the inspection target since joints and formwork marks are often regularly spaced. Examples of the artifact include a fence, stairs, a catwalk, a wire net, a net, cord, a pipe, a light, an electric message board, and a panel. Wide range artifacts, such as a fence, stairs, a catwalk, a wire net, and a net, have a relatively large area, and the inclusion of part of such an artifact in the report image facilitates identifying the location of the spot. Moreover, narrow range artifacts, such as a cord, a pipe, a light, an electric message board, and a panel, are also useful in finding out the location of the spot as with the foregoing members. For example, if a light is included in the report image of part of a tunnel, the inspection target is found to be located at a high position, such as the ceiling. Other landmarks available may include a white line on the road, s maintenance hole, and a guardrail. The inclusion of such landmarks in the report image facilitates finding out the location and state of the spot.

<Grouping of Inspection Targets>

Figure 7A:
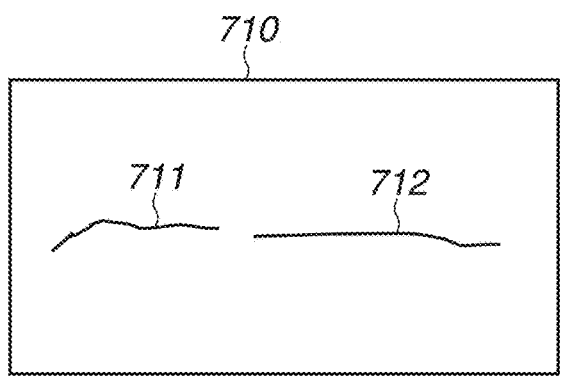
FIGS. 7A, 7B, and 7C are diagrams for describing examples of an inspection target.
Figure 7B:
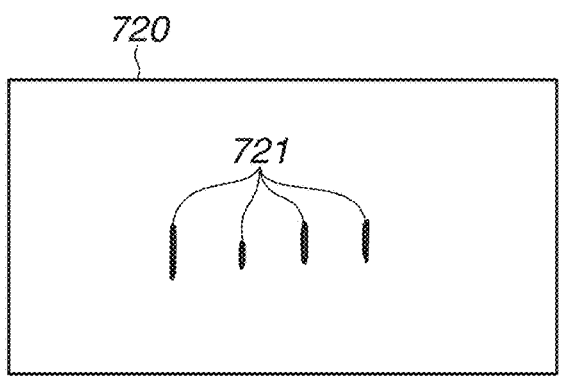

In the foregoing description, the inspection target is a deformation (crack), and the inspection target data includes information about a single deformation. However, the inspection target data may include information about a plurality of deformations. FIGS. 7A and 7B are diagrams illustrating examples of an inspection target including a plurality of deformations. An image 710 in FIG. 7A is a diagram illustrating an inspection target including discontinuous cracks. Discontinuous cracks can extend out and be connected with each other over time. Thus, the information processing apparatus 100 groups discontinuous cracks 711 and 712 so that the cracks 711 and 712 can be recorded together in a report. As a grouping method, first, the inspection target data obtaining unit 210 selects a piece of data of interest from pieces of data on the detected deformations, and sets a deformation search range for searching for a deformation within a predetermined range around the data of interest. Then, the inspection target data obtaining unit 210 groups data on other deformations, if any data is detected in the deformation search range, into one group.

An image 720 in FIG. 7B is a diagram illustrating an inspection target including a plurality of exposed reinforcing iron bars 721 located apart from and adjacent to each other. Such a plurality of exposed reinforcing iron bars 721 can also be handled as data of the same group by the foregoing method. If data on a plurality of deformations is thus grouped as the inspection target, the determination range determining unit 220 and the report range determining unit 250 perform the processing for determining the determination range and the report range on the group.

The examples of FIGS. 7A and 7B have dealt with the inspection target including a plurality of deformations. However, the inspection target is not limited to deformations. The inspection target may be a group of one or more members, one or more deformations, or both. In other words, the information processing apparatus 100 may group different types of objects into one group. For example, the damage degree of a portion of a certain member can be determined based on the member and deformations around the member. If, for example, the range of corrosion around the member is wide, the damage degree can be determined to be high. To include deformations affecting the determination into the determination range, the information processing apparatus 100 then groups the member and the deformations around the member into one group, and determines a determination range for the group.

Figure 7C:
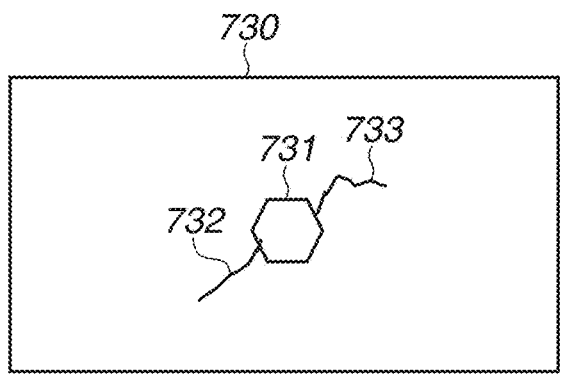

An image 730 in FIG. 7C is a diagram illustrating an example of an inspection target including a member and deformations. The image 730 includes a bolt 731 and cracks 732 and 733. In such a case, the inspection target data obtaining unit 210 obtains the respective pieces of detection data using the crack detection model and a model trained to detect a specific member. Then, the inspection target data obtaining unit 210 sets the deformation search range around the detection data on the member, and groups the detection data on the member and the detection data on deformations included in the deformation search range into one group. In such a manner, the information processing apparatus 100 may group a plurality of objects into one group, and determine the determination range and the report range for the grouped objects.

If the inspection target includes a member, the determination range determining unit 220 may determine the determination range so that the center of the image range coincides with the center of the member. In such a case, the determination unit 230 can easily ensure determination precision by training the damage degree determination model with images including the member at the center, and applying the damage degree determination model to the determination range including the member at the center. Moreover, the information processing apparatus 100 may exclude insignificant data (for example, data not contributing to the damage degree determination) from the group. An example of the data to be excluded is data on a deformation without severe damage (thin crack). Compared to a thick crack, a thin crack has a low degree of damage and can be regarded as the insignificant data. As another example, data at a relatively large distance from a specific member can be regarded as the insignificant data in making the damage degree determination on the specific member. The exclusion of the insignificant data from the group can remove unneeded information from the determination range and facilitate ensuring the determination precision.

In the foregoing first exemplary embodiment, the information processing apparatus 100 determines the determination range based on the inspection target data and the predetermined size. In a second exemplary embodiment, the predetermined size is not provided, and the determination range is determined based on a range including the inspection target. Specifically, the information processing apparatus 100 detects grid pattern cracks from an image, and determines the determination range and the report range based on a range including the grid pattern cracks. The grid pattern cracks are a deformation occurring in a structural member, such as a floor slab of a bridge. The grid pattern cracks are a deformation resulting from the occurrence of cracks in one direction of the structural member (direction orthogonal to the axis of the structural member) due to drying shrinkage, followed by the occurrence of cracks in a direction orthogonal to that of the original cracks (direction of the axis of the structural member) due to repetitive application of load to that portion from vehicles. Such a deformation is particularly significant because a closed area formed by the cracks can come off and fall down. An information processing apparatus 100 according to the second exemplary embodiment has a similar configuration to that of the information processing apparatus 100 according to the first exemplary embodiment. Thus, similar components to those of the first exemplary embodiment are denoted by the same reference numerals, and redundant descriptions thereof will be omitted. Details of the second exemplary embodiment will be described below with reference to FIGS. 8 to 10.

Figure 8:
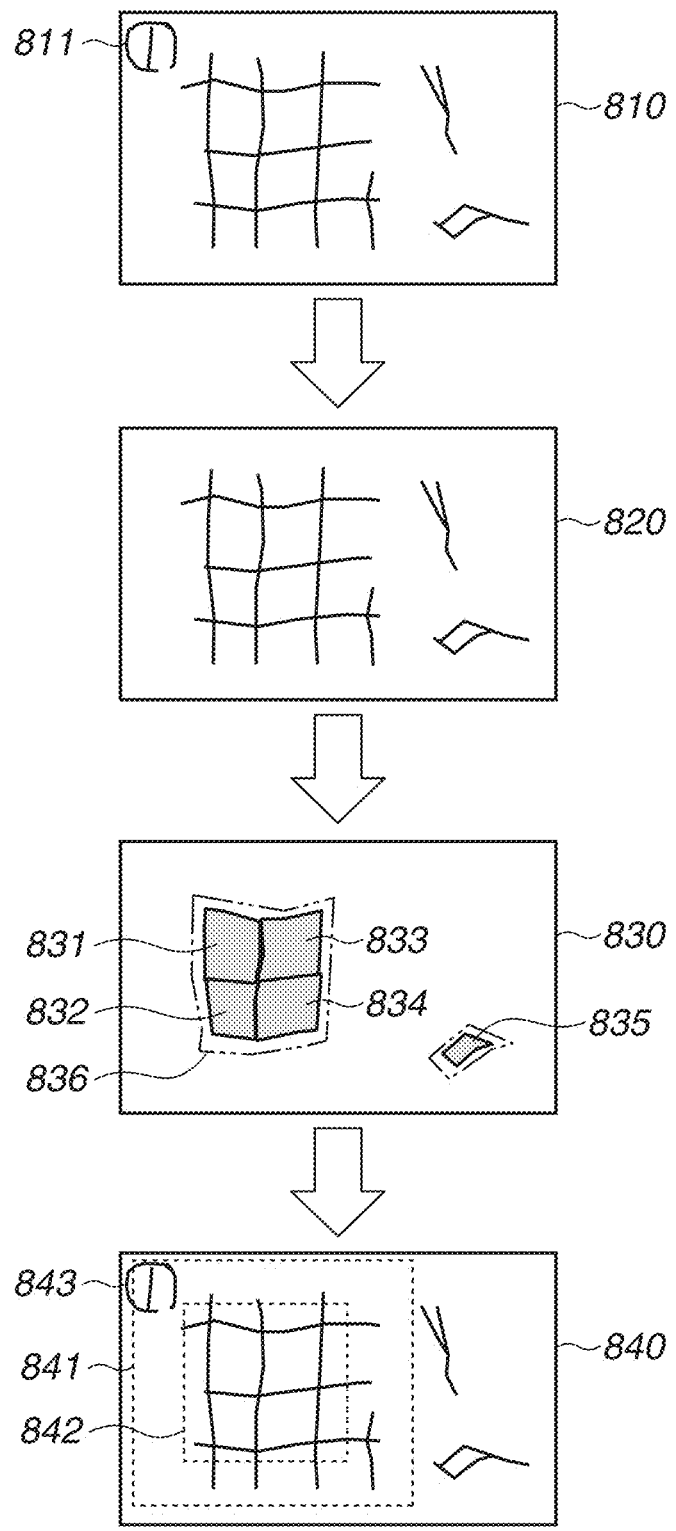
FIG. 8 is a diagram for describing processing by an information processing apparatus according to a second exemplary embodiment.

FIG. 8 is a diagram for describing processing for obtaining data on grid pattern cracks. In the second exemplary embodiment, the inspection target data obtaining unit 210 detects the grid pattern cracks from an image 810, and obtains a range including the grid pattern cracks as inspection target data. Specifically, the inspection target data obtaining unit 210 obtains polyline data to be described below by processing detection data on cracks, and identifies the range including the grid pattern cracks by using the polyline data. Chalk lines 811 in the image 810 represent a number written in chalk as in the example of the first exemplary embodiment.

Figure 9:
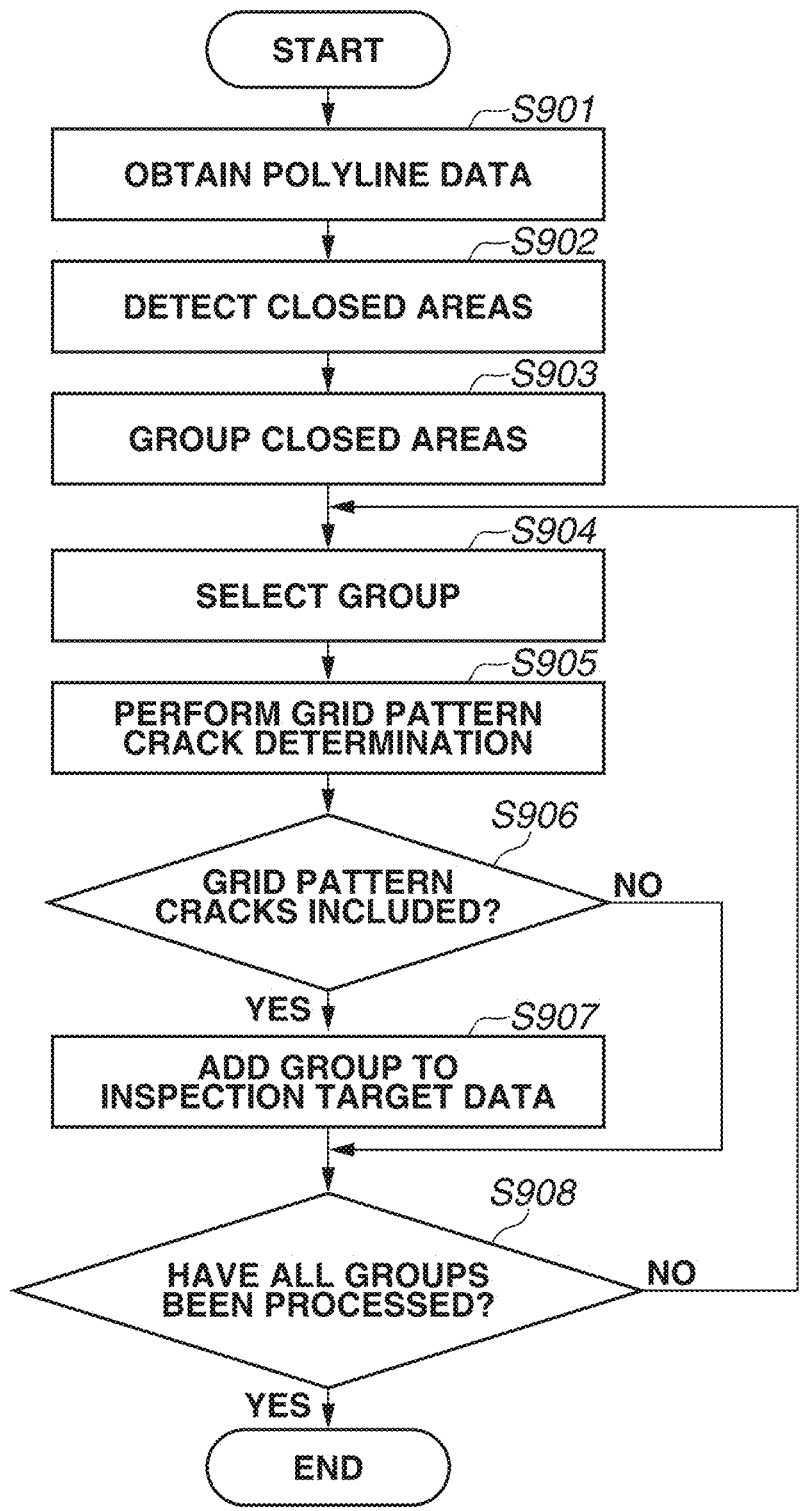
FIG. 9 is a flowchart illustrating processing by the information processing apparatus according to the second exemplary embodiment.

Processing by the information processing apparatus 100 according to the second exemplary embodiment differs from that of the flowchart of FIG. 4A mainly in the details of the processing of S420. The processing will be described in detail with reference to FIG. 9, and a description of the other processing will be omitted. FIG. 9 is a flowchart illustrating processing performed by the inspection target data obtaining unit 210 according to the second exemplary embodiment. After completion of the processing of FIG. 9, the processing of S430 and the subsequent operations in FIG. 4A is performed with the range including the grid pattern cracks as the inspection target data. The processing of FIG. 9 is implemented by the CPU 101 loading a program stored in the ROM 102 into the RAM 103 and executing the program.

First, in S410, the image obtaining unit 200 obtains an image to be inspected. In S901, the inspection target data obtaining unit 210 obtains polyline data as the detection data on cracks. The polyline data is data including position information about the cracks detected, and represent areas connecting adjacent pixels detected as the cracks by line segments. In the second exemplary embodiment, the inspection target data obtaining unit 210 obtains the polyline data by applying image processing, such as line thinning processing and vectorization processing, to the detection data on cracks. An image 820 in FIG. 8 is polyline data obtained from the image 810.

In S902, the inspection target data obtaining unit 210 detects closed areas formed by the cracks by using the polyline data obtained in S901. Here, the inspection target data obtaining unit 210 uses seed fill, an image processing technique. Seed fill is a method for filling a continuous area in an image (inside or outside a closed area) by filling a pixel at a starting point and then repeating processing for filling a pixel adjoining a filled pixel if the adjoining pixel is not a contour pixel, with a given pixel on the image as the starting point. In the example of FIG. 8, the inspection target data obtaining unit 210 applies the technique to the image 820 and detects areas 831, 832, 833, 834, and 835 as closed areas as illustrated in an image 830. While, in the second exemplary embodiment, the image processing technique is used as the method for detecting closed areas, a model trained to detect closed areas may be prepared in advance, and the closed areas may be detected by using the model.

In S903, the inspection target data obtaining unit 210 groups adjoining closed areas of the closed areas detected in S901. In the example of FIG. 8, the closed areas 831, 832, 833, and 834 adjoin each other and are thus grouped into a group 836. The closed area 835 has no adjoining closed area and is regarded as a group by itself. Not only the adjoining closed areas but also an area of polyline including the adjoining closed areas may be grouped into the same group. Then, in S904, the inspection target data obtaining unit 210 selects one of the groups obtained in S903. In S905, the inspection target data obtaining unit 210 determines whether the selected group includes grid pattern cracks. Specifically, the inspection target data obtaining unit 210 makes the determination based on the closed area(s) included in the group and/or the direction of the polyline. As an example, the inspection target data obtaining unit 210 determines whether there are two or more closed areas in the group. As another example, the inspection target data obtaining unit 210 determines whether the polyline passing through the group includes two or more polylines extending vertically and two or more polylines extending horizontally with respect to the structural member. The direction of a polyline is detected, for example, from the direction of a vector connecting the starting point and end point of the polyline.

If, as a result of the determination processing of S905, the group is determined to include the grid pattern cracks (YES in S906), the processing proceeds to S907. In S907, the inspection target data obtaining unit 210 adds the group to the inspection target data. On the other hand, if the group is determined to not include the grid pattern cracks (NO in S906), the processing proceeds to S908. In the example of FIG. 8, the group 836 is determined to be a range including the grid pattern cracks. On the other hand, the group of the closed area 835 is determined to not be the range including the grid pattern cracks. In S908, the inspection target data obtaining unit 210 checks whether the grid pattern crack determination processing has been performed on all the groups formed in S903. If all the groups have been processed (YES in S908), the processing of the flowchart of FIG. 9 ends, and the processing returns to the flowcharts of FIGS. 4A and 4B. On the other hand, if there is a group on which the grid pattern crack determination processing has not been performed (NO in S908), the processing returns to S904 to select the next group.

By the foregoing processing of the flowchart of FIG. 9, a range including grid pattern cracks (specific object) can be obtained as the inspection target data. The subsequent processing can be performed by a similar method to that of the first exemplary embodiment. First, the determination range determining unit 220 determines a determination range 842 for an image 840 (the same as the image 810) so that the group 836 (inspection target data) is included. Then, the determination unit 230 makes a damage degree determination on the determination range 842, and obtains the result of the damage degree determination. Next, the report range determining unit 250 determines the report range based on the inspection target data and the landmark data as in the first exemplary embodiment. Suppose here that the landmark data obtaining unit 240 has obtained detection data (landmark data) on an area 843 as a detection result of the chalk lines 811, and the report range determining unit 250 determines a report range 841 so that the group 836 and the area 843 are included.

In the second exemplary embodiment, the determination unit 230 makes a damage degree determination using a damage degree determination model trained with determination images of grid patterns cracks. Alternatively, the determination unit 230 may calculate grid-to-grid distances and make the damage degree determination based on the grid-to-grid distances without using the damage degree determination model. Specifically, first, the determination unit 230 calculates a crack-to-crack distance of each closed area in the grid pattern cracks. The crack-to-crack distance is detected from the number of pixels and converted into an actual size. The determination unit 230 further determines an average, a minimum value, or a maximum value of the crack-to-crack distances of the closed areas, and uses the value as the grid-to-grid distance of the grid pattern cracks. The determination unit 230 compares the grid-to-grid distance with a predetermined criterion and makes the damage degree determination. For example, if the grid-to-grid distance is 20 cm or less, the damage degree rank is A.

In the second exemplary embodiment described above, image ranges respectively suitable for determination purposes and report purposes can be determined for a range including grid pattern cracks serving as the inspection target in structure inspection. An image from which the position and state of the inspection target can be easily found out afterward can thereby be recorded and left as the report image, with determination precision for the inspection target ensured. In other words, the efficiency of structure inspection can be improved.

While, in the foregoing description, the inspection target is grid pattern cracks, the inspection target may include not only grid pattern cracks but also hexagonal pattern cracks and a closed crack area (closed crack). The hexagonal pattern cracks refer to a plurality of cracks developed to intersect with each other and form closed areas in a hexagonal pattern. The grid pattern cracks, the hexagonal pattern cracks, and the closed crack are examples of the specific object. To detect ranges including the grid pattern cracks, the hexagonal pattern cracks, and the closed crack in a collective manner, the inspection target data obtaining unit 210 detects all intersections of vectors constituting the polyline, and obtains the inspection target data based on density of the intersections.

Figure 10:
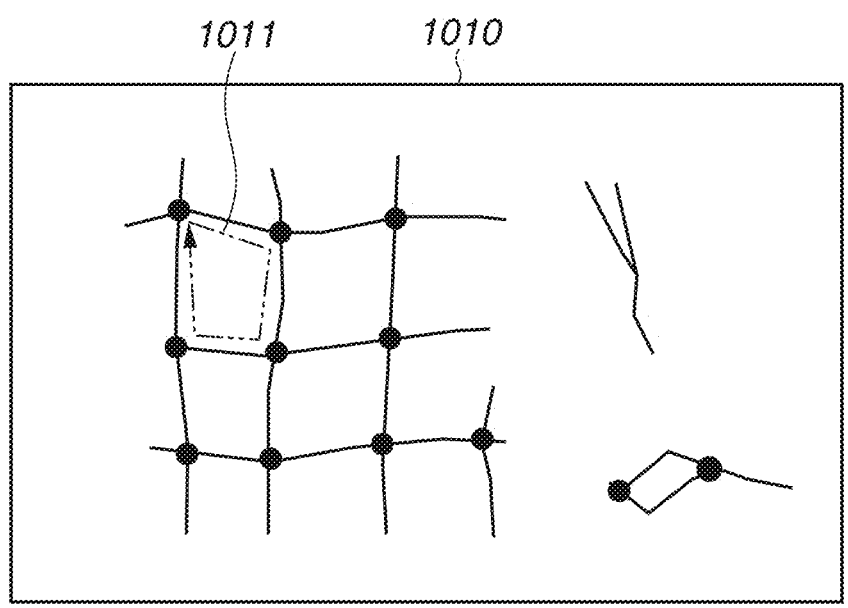
FIG. 10 is a diagram for describing the processing by the information processing apparatus according to the second exemplary embodiment.

FIG. 10 is a diagram for describing processing for obtaining the inspection target data by using the intersections of polyline vectors. An image 1010 is the same image as the image 820, and illustrates polyline data. Points indicated by black dots represent vector intersections. For example, the inspection target data obtaining unit 210 sections the image 1010 into a plurality of cells, calculates the density of intersections in each cell, and determines the presence of deformation in a high density cell. Such a method involves less processing and can reduce execution time, although the inspection target data does not have as high positional precision as in the processing of the flowchart of FIG. 9. A method using the intersections and the vectors may be employed instead of the method using the density of the intersections. For example, the inspection target data obtaining unit 210 traces the polyline vectors starting at an intersection as illustrated by a double-dotted dashed line 1011 in the image 1010, and determines that there is a closed area (deformation) if the vectors are tracked back to the original intersection. The method using the intersections and the vectors can improve the positional precision of the inspection target data compared to the method using the density of the intersections.

In a third exemplary embodiment, an information processing apparatus 100 determines a report range by using a method different from those of the foregoing exemplary embodiments. In the foregoing exemplary embodiments, the information processing apparatus 100 detects chalk lines as a landmark. In the third exemplary embodiment, the information processing apparatus 100 detects a plurality of types of landmarks set in advance. If the plurality of types of landmarks is detected, the information processing apparatus 100 selects one of the landmarks and includes the selected landmark into the report range. For example, a landmark more likely to lead to location identification when the report image is observed afterward can be selected to facilitate finding out where the inspection target is. In the third exemplary embodiment, landmark data obtained by a landmark data obtaining unit 240 will be referred to as candidate data. Landmark data selected to be included into the report range from among pieces of candidate data will be referred to as selection data. Details of the third exemplary embodiment will be described in detail below with reference to FIGS. 11 to 13B.

Figure 11:
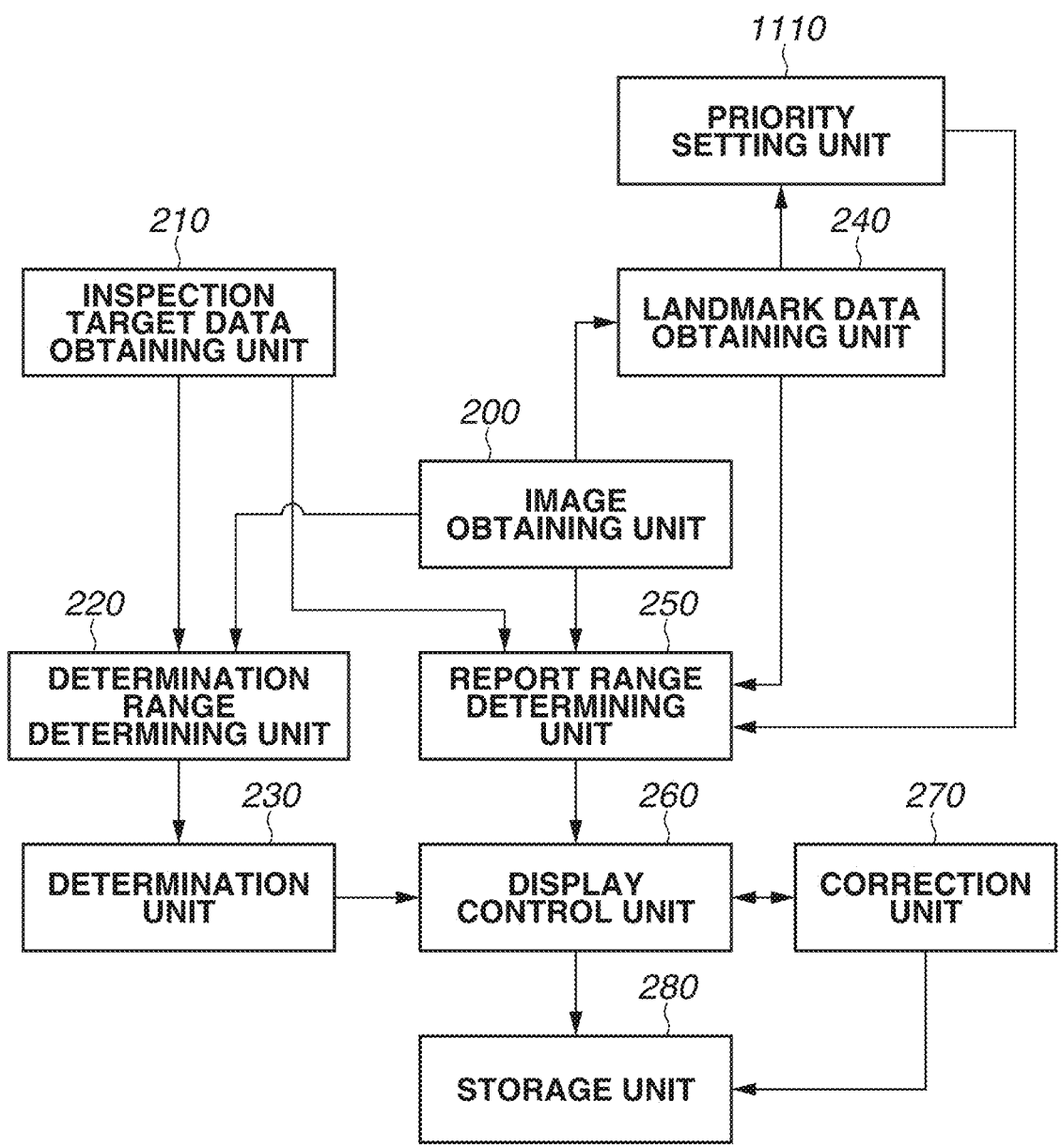
FIG. 11 is a block diagram illustrating a functional configuration of an information processing apparatus according to a third exemplary embodiment.

FIG. 11 is a block diagram illustrating an example of a functional configuration of the information processing apparatus 100 according to the third exemplary embodiment. The information processing apparatus 100 functions as functional units illustrated in FIG. 11 by a CPU 101 loading programs stored in a ROM 102 into a RAM 103 and executing the programs. The information processing apparatus 100 according to the third exemplary embodiment further includes a priority setting unit 1110 in addition to the functional units of the information processing apparatus 100 according to the first exemplary embodiment. The priority setting unit 1110 sets degrees of priority among the pieces of candidate data obtained by the landmark data obtaining unit 240. The report range determining unit 250 determines the selection data from among the pieces of candidate data based on the degrees of priority, and determines the report range based on the selection data.

The processing by the information processing apparatus 100 according to the third exemplary embodiment is similar to that of the flowchart of FIG. 4A, but the processing where the report range determining unit 250 determines the report range (S450) differs. Details of the processing for determining the report range will now be described with reference to FIGS. 13A and 13B and the flowchart of FIG. 12. The processing of the flowchart of FIG. 12 is implemented by the CPU 101 loading programs stored in the ROM 102 into the RAM 103 and executing the programs.

Figure 13A:
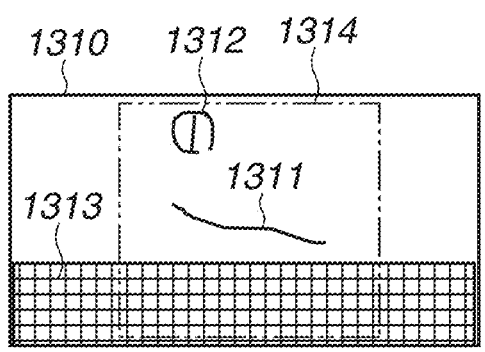
FIGS. 13A and 13B are diagrams for describing the processing by the information processing apparatus according to the third exemplary embodiment.
Figure 13B:
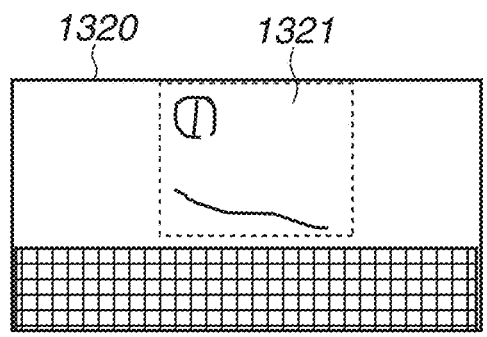

FIGS. 13A and 13B are diagrams for describing the processing for determining the report range by using the selection data. In the third exemplary embodiment, a method where the information processing apparatus 100 obtains an image 1310 of FIG. 13A and performs a series of processes to be described below on the image 1310 will be described. The image 1310 includes a crack 1311, chalk lines 1312, and a wire net 1313. Suppose here that the information processing apparatus 100 has obtained detection data on the crack 1311 as inspection target data and determines a determination range and a report range based on the inspection target data.

First, in S1201, similar to S451 of FIG. 4B, the report range determining unit 250 sets a landmark search range for the inspection target data on the image 1310. FIG. 13A illustrates a landmark search range 1314 set for the detection data on the crack 1311. Next, in S1202, the landmark data obtaining unit 240 obtains candidate data on landmarks from the landmark search range 1314. Here, the landmark data obtaining unit 240 applies a model for detecting chalk lines and a model for detecting artifacts, such as a wire net and a cord, to the image of the landmark search range 1314. The landmark data obtaining unit 240 thereby obtains detection data corresponding to the chalk lines 1312 and detection data corresponding to the wire net 1313. Such pieces of detection data are the candidate data on landmarks.

Then, in S1203, the landmark data obtaining unit 240 determines whether there is the candidate data obtained. If there is determined to be the candidate data (YES in S1203), the processing proceeds to S1204. In S1204, the priority setting unit 1110 sets a degree of priority for each piece of candidate data. In S1205, the priority setting unit 1110 determines the selection data from among the pieces of candidate data based on the set degrees of priority. On the other hand, if there is determined to be no candidate data (NO in S1203), the processing proceeds to S1206 since there is no landmark to set the degree of priority for in the landmark search range 1314.

The processing of S1204 will now be described in detail. The priority setting unit 1110 stores degrees of priority associated with the types of landmarks in advance, and sets the degrees of priority corresponding to the types based on the types of candidate data. Alternatively, the priority setting unit 1110 may set the degrees of priority for the candidate data based on the result of an inquiry made of the user about the degrees of priority in advance. For example, the priority setting unit 1110 displays a screen from which the order of priority among various landmarks including chalk lines, members, block boundaries, and artifacts can be specified on the display unit 105, and sets the degrees of priority based on user operations. If the degree of priority of chalk lines is set to be high here, the degrees of priority of the candidate data (the detection data on the chalk lines 1312 and the detection data on the wire net 1313) are set so that the detection data on the chalk lines 1312 has a higher degree of priority than that of the detection data on the wire net 1313. In such a case, in S1205, the detection data on the chalk lines 1312 is determined as the selection data since the degree of priority of chalk lines is high. The number of pieces of selection data is not limited to one, and a plurality of pieces of candidate data ranked higher in the order of priority may be determined as the selection data. If there is obtained only one piece of candidate data, the candidate data may be simply determined as the selection data.

In S1206, similar to S453 of FIG. 4B, the report range determining unit 250 determines the report range based on the inspection target data and the selection data. FIG. 13B illustrates a report range 1321 determined to include the detection data on the crack 1311 and the detection data on the chalk lines 1312 for an image 1320 that is the same as the image 1310. After S1206, the processing proceeds to S460.

In the third exemplary embodiment described above, a landmark more likely to lead to location identification can be included in the report image range by priority. This further facilitates finding out the position of the inspection target when the report is observed afterward. In other words, the efficiency of the structure inspection can be improved.

<Method for Setting Degrees of Priority>

The method for setting the degrees of priority is not limited to the method described with reference to the flowchart of FIG. 12. Possible methods include a method based on a positional relationship between the inspection target data and the candidate data, a method based on rarity of the candidate data, and a method based on conspicuity of the candidate data. The methods will now be described. First, the method based on the positional relationship between the inspection target data and the candidate data will be described. The information processing apparatus 100 calculates a distance between each piece of candidate data and the inspection target data. The priority setting unit 1110 then sets higher degrees of priority for pieces of candidate data closer to the inspection target data.

Next, the method based on the rarity of the candidate data will be described. In this method, the priority setting unit 1110 sets the degrees of priority of rare landmarks on the structure to be high on the assumption that the use of landmarks smaller in number on the structure is more likely to lead to location identification. Specifically, first, the information processing apparatus 100 applies models suitable for the respective types of landmarks to each of a plurality of cell images to calculate the total numbers of pieces of detection data corresponding to the respective models. The smaller the total number, the higher the rarity. Thus, the priority setting unit 1110 sets higher the degrees of priority for the types of candidate data with the smaller total numbers. For example, cracks occurring on a wall surface during construction (joints and formwork marks) are greater in number than diagonal members, and thus are less likely to lead to location identification when observed afterward. Landmarks more likely to lead to location identification can thus be preferentially included in the report image range by reducing the degrees of priority of joints and formwork marks and increasing the degree of priority of diagonal members.

Then, the method based on the conspicuity of the candidate data will be described. In this method, more conspicuous landmarks are included into the report range. Specifically, first, the information processing apparatus 100 calculates a luminance difference between inside and outside of each piece of candidate data based on the pixel values within the candidate data and the pixel values around the candidate data. The greater the luminance difference, the higher the conspicuity. Then, the priority setting unit 1110 sets higher degrees of priority for pieces of candidate data with larger luminance differences. The method based on the conspicuity is not limited to luminance differences, and may use the sizes of the areas, for example.

In S1202 of FIG. 12, the landmark data obtaining unit 240 obtains the candidate data on landmarks by applying the models suitable for the respective types of landmarks. However, the method for obtaining the candidate data is not limited thereto. For example, the candidate data may be obtained by using a saliency map. The saliency map is a map visualizing areas estimated to more likely draw human attention in the image. For example, the saliency map is obtained by generating maps of characteristic spots detected from the image in terms of items such as luminance information and color information, and determining a linear sum of the maps pixel by pixel. The landmark data obtaining unit 240 converts pixels below a predetermined value in the saliency map into 0, whereby areas where non-zero pixels continue are obtained as the candidate data. Then, the landmark data obtaining unit 240 sets the degrees of priority based on the pixel values constituting the candidate data. For example, the landmark data obtaining unit 240 obtains statistics, such as an average and a maximum value, of the pixel values in each piece of candidate data, and sets the degrees of priority based on the statistics.

In the foregoing exemplary embodiments, the information processing apparatus 100 determines the determination range and the report range from a single image. By contrast, in a fourth exemplary embodiment, an information processing apparatus 100 uses two images including the same inspection target to determine the determination range from one of the two images and the report image from the other. The image to apply damage degree determination and the image to be recorded for report purposes can thus be captured by respective appropriate methods. Since the fourth exemplary embodiment can be implemented by a similar configuration to that of the first exemplary embodiment, redundant descriptions thereof will be omitted. The inspection target in the fourth exemplary embodiment is grid pattern cracks. Differences of the image obtaining unit 200, the determination range determining unit 220, and the report range determining unit 250 from those of the first exemplary embodiment will now be described with reference to FIG. 14.

The image obtaining unit 200 obtains a plurality of images including the same inspection target. Specifically, the image obtaining unit 200 obtains an image 1410 of FIG. 14 as the image to apply the damage degree determination. The image 1410 is an image of a wall surface of a structure, captured from right in front thereof to show the inspection target in an enlarged scale. Meanwhile, the image obtaining unit 200 obtains an image 1420 of FIG. 14 as an image to cut out the report range. The image 1420 is an image of the wall surface of the structure, captured so that surroundings of the inspection target are also included. The images 1410 and 1420 include the same inspection target. Areas 1421 and 1422 of the image 1420 include beams. The fourth exemplary embodiment uses the beams as the landmarks.

Next, processing by the determination range determining unit 220 and the report range determining unit 250 will be described. First, the determination range determining unit 220 determines a determination range 1431 for the image 1410 so that the inspection target is included. Then, the report range determining unit 250 determines a report range 1441 for the image 1420 so that the inspection target and part of the landmarks (beams) are included. Since both of the processes can be performed by the method described in the first exemplary embodiment, a detailed description thereof will be omitted.

While the method using two images including the same inspection target has been described above, the information processing apparatus 100 may use a viewpoint-converted image as at least one of the two images. In such a case, the image obtaining unit 200 generates the viewpoint-converted image where the inspection target is seen from a virtual viewpoint, based on images of the same inspection target captured at a plurality of positions. Then, at least one of the determination range determining unit 220 and the report range determining unit 250 performs processing using the viewpoint-converted image.

In the fourth exemplary embodiment described above, images respectively appropriate for determination purposes and report purposes can be cut out by determining the determination range and the report range using a plurality of images including the same inspection target. An image from which the position and state of the inspection target can be easily found out afterward can thereby be recorded and left as the report image, with determination precision for the inspection target ensured. In other words, the efficiency of structure inspection can be improved.

While the present disclosure has described above the exemplary embodiments thereof, the foregoing exemplary embodiments are merely examples of embodiments, and the technical scope of every embodiment should not be interpreted as limited thereto. In other words, the exemplary embodiments can be practiced in various forms without departing from the technical concept or main features of the same.

Some exemplary embodiments can be implemented by processing for supplying a program for implementing one or more functions of the foregoing exemplary embodiments to a system or an apparatus via a network or a storage medium, and reading and executing the program by one or more processors in a computer of the system or apparatus. A circuit for implementing one or more functions (for example, application specific integrated circuit (ASIC)) may be used for implementation.

According to the foregoing exemplary embodiments, the efficiency of an image-based operation can be improved by appropriately determining image ranges.

Other Embodiments

Some embodiments can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-171113, which was filed on Oct. 9, 2020 and which is hereby incorporated by reference herein in its entirety.

What is claimed is:

1. An information processing apparatus comprising:
one or more computer-readable storage media; and
one or more processors that are in communication with the one or more non-transitory computer-readable storage media, wherein the one or more processors and the one or more non-transitory computer-readable storage media are configured to:
obtain an image;
determine a first image range to be used in making a determination related to inspection of an inspection target included in the image, based on a detection result of the inspection target from the image; and
determine a second image range to be used in recording an inspection result of the inspection target, the second image range being an image range indicating a wider range than a range indicated by the first image range.

2. The information processing apparatus according to claim 1, wherein the second image range includes the inspection target.

3. The information processing apparatus according to claim 1, wherein the one or more processors and the one or more non-transitory computer-readable storage media are further configured to obtain data indicating a characteristic portion in the image, wherein the second image range is determined based on the data.

4. The information processing apparatus according to claim 3, wherein the one or more processors and the one or more non-transitory computer-readable are further configured to:
obtain data indicating the characteristic portion within a predetermined range of distance with reference to a position of the inspection target, and to include at least part of the characteristic portion in the second image range.

5. The information processing apparatus according to claim 4, wherein the one or more processors and the one or more non-transitory computer-readable storage are further configured to, if there is no characteristic portion within the predetermined range of distance, determine a range of distance with reference to the position of the inspection target greater than the predetermined range as the second image range.

6. The information processing apparatus according to claim 3, wherein the one or more processors and the one or more non-transitory computer-readable storage are further configured to:
if the data indicates a plurality of characteristic portions, set a degree of priority for each of the plurality of characteristic portions, and
determine the second image range based on at least one of the plurality of characteristic portions selected based on the degrees of priority of the respective plurality of characteristic portions.

7. The information processing apparatus according to claim 6, wherein the one or more processors and the one or more non-transitory computer-readable storage are further configured to set the degrees of priority of the respective plurality of characteristic portions based on at least any one of a positional relationship between the inspection target and each of the plurality of characteristic portions, rarity of each of the plurality of characteristic portions, and conspicuity of each of the plurality of characteristic portions.

8. The information processing apparatus according to claim 1, wherein the one or more processors and the one or more non-transitory computer-readable storage are further configured to determine the first image range based on an image condition of an image used to train a trained model to be used in making the determination.

9. The information processing apparatus according to claim 1, wherein the one or more processors and the one or more non-transitory computer-readable storage are further configured to select one of a plurality of trained models based on a size of the first image range, and make the determination by using the trained model selected.

10. The information processing apparatus according to claim 1, wherein the one or more processors and the one or more non-transitory computer-readable storage are further configured to determine the second image range to not exceed a maximum size based on at least any one of a size of the inspection target, resolution of the image, and an image size of the recording.

11. The information processing apparatus according to claim 1, wherein the one or more processors and the one or more non-transitory computer-readable storage are further configured to detect an object from the image, wherein the inspection target is based on a detection result of the detection.

12. The information processing apparatus according to claim 11, wherein the inspection target is a group including a first object detected by according to the detection result and a second object detected according to the detection result, the second object being an object lying within a predetermined range of distance with reference to a position of the first object.

13. The information processing apparatus according to claim 1, wherein the one or more processors and the one or more non-transitory computer-readable storage are further is configured to determine a plurality of image ranges of different sizes, and determine one of the plurality of image ranges selected based on a user operation as the second image range.

14. The information processing apparatus according to claim 1, wherein the one or more processors and the one or more non-transitory computer-readable storage are further configured to control display of a result of the determination using the first image range and an image cut out to the second image range.

15. The information processing apparatus according to claim 1, wherein the one or more processors and the one or more non-transitory computer-readable storage media are further configured to correct either a result of the determination using the first image range or the second image range based on a user operation.

16. The information processing apparatus according to claim 1, wherein the one or more processors and the one or more non-transitory computer-readable storage media are further configured to store a result of the determination using the first image range and an image cut out to the second image range in association with each other.

17. The information processing apparatus according to claim 1, wherein the one or more processors and the one or more non-transitory computer-readable storage media are further configured to:
    determine the first image range in the image, and determine the second image range in another image different from the image.

18. The information processing apparatus according to claim 1, wherein the image is a viewpoint-converted image.

19. The information processing apparatus according to claim 1, wherein the inspection target is a grid pattern crack, a hexagonal pattern crack, or a closed crack.

20. The information processing apparatus according to claim 1, wherein the determination is determination of a damage degree of the inspection target.

21. The information processing apparatus according to claim 1, wherein the one or more processors and the one or more non-transitory computer-readable storage are further configured to output coordinate information about each of the first and second image ranges.

22. An information processing apparatus comprising:
    one or more computer-readable storage media; and
    one or more processors that are in communication with the one or more non-transitory computer-readable storage media, wherein the one or more processors and the one or more non-transitory computer-readable storage media are configured to:
    obtain an image;
    detect a landmark from the image, the landmark being a characteristic portion having a characteristic different from a characteristic of an area nearby; and
    determine an image range including an object included in the image and the landmark as an image range to be used in recording an inspection result of an inspection target, the object being the inspection target.

23. An information processing method comprising:
    determining a first image range to be used in making a determination related to inspection of an inspection target included in an image, based on a detection result of the inspection target from the image; and
    determining a second image range to be used in recording an inspection result of the inspection target, the second image range being an image range indicating a wider range than a range indicated by the first image range.

24. A non-transitory computer readable storage medium storing a program for causing a computer to execute an information processing method, the information processing method comprising:
    determining a first image range to be used in making a determination related to inspection of an inspection target included in an image, based on a detection result of the inspection target from the image; and
    determining a second image range to be used in recording an inspection result of the inspection target, the second image range being an image range indicating a wider range than a range indicated by the first image range.

25. The information processing apparatus according to claim 1,
    wherein the inspection target is on an object, and
    wherein the second image range includes information related to a position of the inspection target on the object.

26. The information processing apparatus according to claim 25,
    wherein the object is a structure,
    wherein the inspection target is one or more cracks, and
    wherein the determination related to the inspection of the inspection target is a determination of degrees of damage of the structure.

* * * * *